July 22, 1958     H. J. PASSINO ET AL     2,844,555
SOLUTIONS OF PLASTICIZED PERFLUOROCHLOROCARBON
POLYMERS, METHOD OF PREPARATION, AND
PROCESS OF COATING WIRE THEREWITH
Filed Dec. 29, 1949
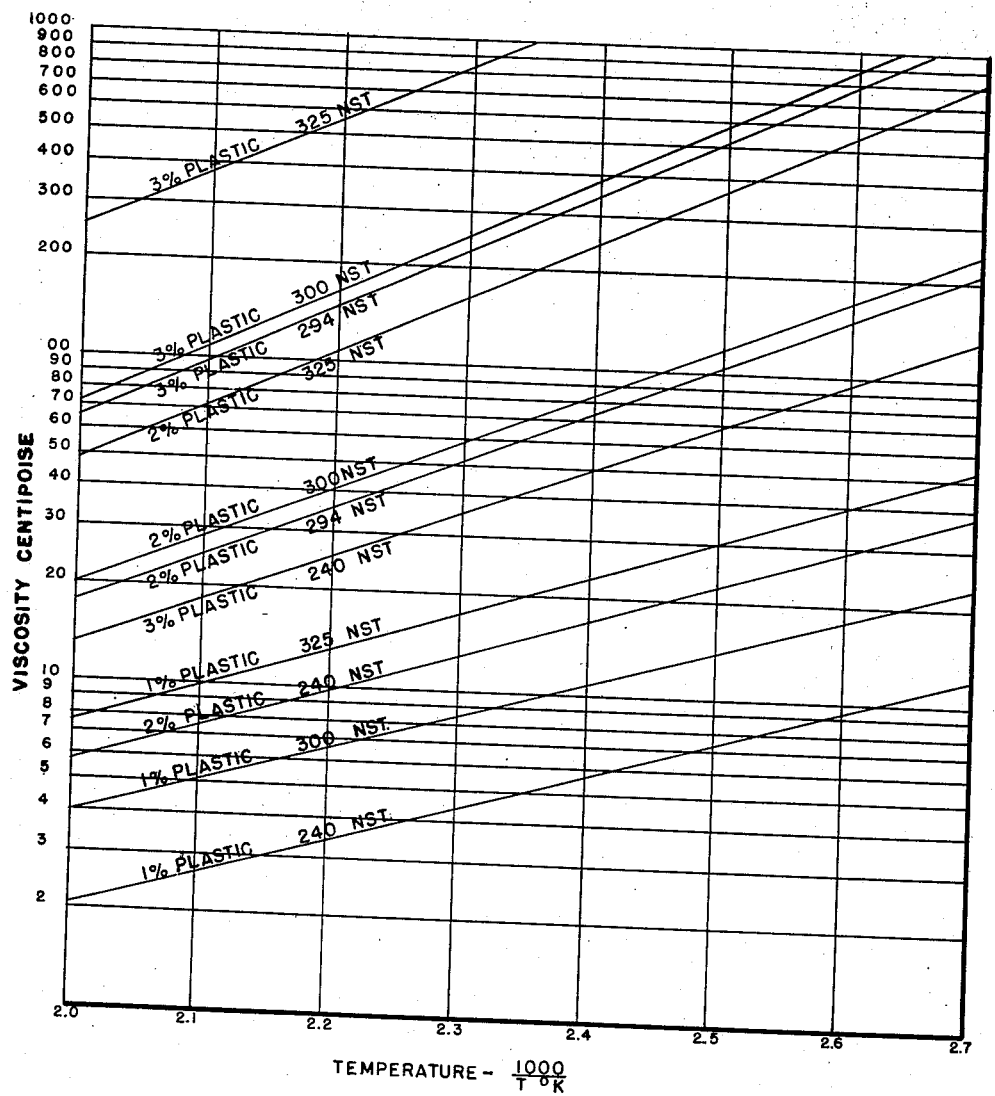
VISCOSITY TEMPERATURE CURVES
FOR PLASTIC PERFLUOROCHLOROBUTANE
SOLUTIONS
INVENTORS
H.J. PASSINO
J.M. WRIGHTSON
BY E. F. Liebrecht
Cruzan Alexander
ATTORNEYS

United States Patent Office 2,844,555
Patented July 22, 1958

2,844,555

SOLUTIONS OF PLASTICIZED PERFLUORO-CHLOROCARBON POLYMERS, METHOD OF PREPARATION, AND PROCESS OF COATING WIRE THEREWITH

Herbert J. Passino, Englewood, and John M. Wrightson, North Bergen, N. J., assignors, by mesne assignments, to Minnesota Mining and Manufacturing Company, St. Paul, Minn., a corporation of Delaware Application December 29, 1949, Serial No. 135,614

17 Claims. (Cl. 260—33.8)

This invention relates to solutions of perfluorochlorocarbon polymers. In one aspect this invention relates to the prepartion of solutions of normally solid polytrifluorochloroethylene for use in surface coating of solids. In another aspect this invention relates to the method of coating solid surfaces with polytrifluorochloroethylene.

Polytrifluorochloroethylene in the normally solid state as a wax or a plastic may be used to coat materials, such as meterals which are susceptible to corrosion. Metals such as iron, aluminum and copper may be coated with the solid polymer of trifluorochloroethylene and, as a result, rendered substantially inert to corrosion by acids and alkalis and other corrosive materials. The normally solid polymer of trifluorochloroethylene is also an extremely good insulator. Coating of metal wires and other conductors with the normally solid polymer of trifluorochloroethylene is useful in the construction of electrical motors and other electrical apparatus in which it is desired to insulate certain parts thereof. Due to the high insulating qualities of the above solid polymer, particularly the plastic form, very thin films of the polymer will serve as a good insulator for electrical conductors. Films of normally solid polytrifluorochloroethylene of between about 0.1 and about 5 mils have been found suitable for copper wire for use as armatures in electrical motors. The solid polymer may also be used as insulating material between plates of electrical condensers. The uses and applications of the solid perfluorochlorocarbon polymer for both electrical insulating and corrosion resistant purposes are unlimited.

The solid polymer may be applied to the various surfaces by melting the polymer and coating the surface with the fluidized polymer. This manner of applying the solid polymer to solid surfaces has certain disadvantages. One disadvantage is that the plastic at the temperature in which it can be applied in a fluid state has a tendency to decompose and the decomposition products corrode the surfaces, particularly the metal and glass surfaces, which it contacts. The decomposition of the polymer also renders it less desirable as a protective coating. Another disadvantage is that it is difficult to obtain relatively thin films of the solid polymer upon the surface of the material to be coated.

According to this invention it has been found that thin films of normally solid polytrifluorochloroethylene can be applied to solid surfaces by dissolving the solid polymer in a suitable solvent and coating the surface with the solution and subsequently evaporating the solvent, thereby leaving a thin film of the solid polymer upon the surface. In this manner of applying the normally solid polymer of trifluorochloroethylene to solid surfaces, very thin film thicknesses can be obtained and the temperatures and conditions of application are such that the plastic is not decomposed. The solid polymer can be applied to metal surfaces, fabrics, paper, leather, glass, porcelain, quartz, and wood. The application of the solid polymer to such articles as wire, cans, gate valves, cables, glassware, plates, is feasible. The solution method is particularly useful for application of the polymer to surfaces of intricate contour and to wires of small diameter, such as wires of 10 to 100 mils in diameter.

Solid polymers of trifluorochloroethylene are prepared by polymerizing the monomer in the presence of a suitable organic peroxide, such as bis-trichloroacetyl peroxide as the polymerizing agent, at a temperature between about —20 and about 25° C., preferably at a temperature of about —16° C., at which temperature the plastic is produced. At a temperature of about —16° C., the polymerization of trifluorochloroethylene to a satisfactory yield of plastic polymer is accomplished in about seven days. At elevated temperatures and superatmospheric pressures less time is required to complete the polymerization and the waxes are generally produced. As the preparation of the polymer is not a part of this invention further discussion thereof is deemed unnecessary and numerous applications have been filed on the preparation of the polymer, including wax and plastic.

The plastic polymer produced from trifluorochloroethylene is hard but not brittle and is flowable under pressure at temperatures above about 225° C. One of the most important physical characteristics of the plastic is its hardness and strength and this is measured in terms of no strength temperature (N. S. T.). A polymer of suitable plastic characteristics for application to solid surfaces has a no strength temperature between about 200 and about 350° C. The no strength temperature of the polymer and its method of determination will be fully discussed hereinafter with regard to the examples. Four-fifths of the weight of the polymer is made up of two halogens, fluorine and chlorine. The plastic is colorless and transparent. The polymer, including both wax and plastic, has a high chemical stability with no effect being observed on the polymer after prolonged exposure to concentrated sulfuric acid, hydrochloric acid and hydrofluoric acid. Also, no effect is observed on the polymer after prolonged exposure to strong caustic solutions, fuming nitric acid, aqua regia, and other vigorous oxidizing materials. The plastic is flexible and resilient and is not wetted by water and is unaffected by high humidity. The plastic has superior electrical characteristics, as shown in Table I below:

TABLE I

*Solid polymer of trifluorochloroethylene*

| Electrical Frequency, cycles/sec. | Dielectric Constant E | Dielectric Power Loss Tan | |
|---|---|---|---|
| $1 \times 10^2$ | 2.72 | 0.022 | 0.0011 |
| $1 \times 10^3$ | 2.63 | 0.27 | 0.0014 |
| $1 \times 10^4$ | 2.53 | 0.023 | 0.0012 |
| $1 \times 10^5$ | 2.46 | 0.0135 | 0.0008 |
| $1 \times 10^6$ | 2.43 | 0.0082 | 0.0004 |
| $1 \times 10^7$ | 2.35 | 0.0060 | 0.0003 |
| $1 \times 10^8$ | 2.30 | 0.0028 | 0.0002 |
| $3 \times 10^8$ | 2.30 | 0.0030 | |
| $3 \times 10^9$ | 2.30 | 0.0028 | 0.0002 |
| $1 \times 10^{10}$ | 2.29 | 0.0039 | 0.0002 |
| $2.5 \times 10^{10}$ | 2.29 | 0.0055 | |

Included also in this disclosure are the general physical characteristics of the plastic polymer of trifluorochloroethylene. These physical characteristics are tabulated in Table II below:

TABLE II

| Tests Conducted on Plastic | Unit of Measure | Results | ASTM Test Method |
| --- | --- | --- | --- |
| Specific gravity | | 2.1 | D792–48T. |
| Refractive index | $n_D^{25}$ | 1.43 | D542–42. |
| Thermal coefficient of linear expansion: | | | |
| −80° to 20° C | in./in.° C | $4.5 \times 10^{-5}$ | D696–44. |
| 20° to 150° C | in./in.° C | $7 \times 10^{-5}$ | D696–44. |
| Thermal conductivity | cal./cm.²/sec./° C./cm | $1.44 \times 10^{-4}$ | |
| Do | K | 0.418 | |
| Specific heat | cal./gm | 0.216 | |
| Water absorption | percent | 0.00 | D570–42. |
| Brittleness temperature | ° F | 120 | D746–44T. |
| Outdoor aging, one year | | No detectable change. | |
| Rockwell hardness | R scale | 111–115 | D785–48T. |
| Durometer hardness | D scale | 80 | D676–47T. |
| Do | A scale | 100 | D676–47T. |
| Impact strength, Izod, notched, 77° F | ft. lb./in. of notch | 3.62 | D256–47T. |
| Tensile strength [1] | p. s. i., 77° F | 5730 | D638–46T. |
| Yield strength, 0.2% offset | p. s. i., 77° F | 3640 | D638–46T. |
| Flexural strength | p. s. i., 77° F | 8260 | D790–45T. |
| Compressive strength | p. s. i., 77° F | 32–87,600 | D695–44T. |
| Modulus of elasticity: | | | |
| Tensile | p. s. i., 77° F | 226,000 | D638–46T. |
| Flexural | p. s. i., 77° F | 182,500 | D790–45T. |
| Compressive | p. s. i., 77° F | 191,000 | D695–44T. |
| Abrasion resistance: | | | Fed. Spec. L–P–406–a method 1091. |
| 59.9946 gm. heat-treated | loss/gm./1,000 cycles 0.0048 | | |
| 57.3753 gm. quenched | loss/gm./1,000 cycles 0.0175 | | |

[1] Tensile strength in oriented film as high as 30,000 p. s. i.

The object of this invention is to provide a solvent for relatively high molecular weight polymers of perfluorochloroolefins.

An object of this invention is to provide a method for applying normally solid polytrifluorochloroethylene to solid surfaces.

Another object of this invention is to provide a solution of normally solid polytrifluorochloroethylene which has suitable characteristics for applying the solution to solid surfaces.

Still another object of this invention is to coat electrical wires with normally solid polytrifluorochloroethylene.

It is a further object of this invention to coat solid surfaces with a relatively thin film of plastic polytrifluorochloroethylene.

Various other objects and advantages of the present invention will become apparent from the accompanying description and disclosure.

According to this invention, a normally solid polymer of trifluorochloroethylene, including waxes and plastics having a no strength temperature between about 200 and about 350° C., is dissolved in a perfluorochlorobutane or mixtures of perfluorochlorobutanes in an amount up to about 10 percent, preferably between about 1 and about 5 percent by weight. The solution is then contacted with a suitable solid surface such as metal wire and thereafter the solvent evaporated, thereby leaving the solid polymer deposited on the surface in the form of a thin homogeneous unbroken film. Solid polytrifluorochloroethylene is soluble in only a very few selected solvents. It has been found that normally solid polytrifluorochloroethylene is also soluble in trifluoropentachloropropane, octafluorooctachloroheptane and tetrachlorodifluoroethane. Not more than about 5 percent by weight of the normally solid polymer can be dissolved in the solvent at workable viscosities. Even then the temperature of the solution must be maintained at about 110° C. or higher. By far, the best solvent has been found to be a perfluorochlorobutane, particularly tetrafluoroperchlorobutane. Trifluoropentachloropropane is a solvent for the plastic, but the cost of manufacture of this solvent and its tendency to sublime makes its use undesirable and not as practical as the perfluorochlorobutanes. Tetrachlorodifluoroethane (Freon 112) is undesirable as a solvent because of the difficulty involved in its application, since this solvent must be employed under pressure in order to maintain it as a liquid. Hydrocarbons, chlorinated hydrocarbons and perfluorocarbons have been found not to dissolve normally solid polytrifluorochloroethylene in sufficient quantity to be considered of any practical value. The polymer is also substantially insoluble in ethers, alcohols and nitrochloro compounds.

The perfluorochlorobutanes useful as solvents are prepared from hexachlorobutadiene which is available commercially on the market. The hexachlorobutadiene is treated with chlorinetrifluoride. Thereafter, the product is fluorinated with cobalt trifluoride to produce a more stable solvent. Although the solvent may be used with or without this fluorination treatment, it is preferred to fluorinate the solvent in order to make it less corrosive to such materials as copper. As previously stated, the solute is a normally solid polymer of trifluorochloroethylene including waxes, and plastics having a no strength temperature between about 200 and about 350° C. It is preferred to grind or pulverize the solid polymer to pass an 80 mesh screen. The solid polymer is then mixed with sufficient solvent to obtain a solution less than about 10 percent, preferably less than 5 percent by weight of solid polymer. The polymer is dissolved in the solvent perfluorochlorobutane by heating the solution to a temperature of at least 120° C. After the critical solution temperature (approx. 120° C.) has been reached, the amount of plastic which dissolves does not appear to be temperature dependant. The concentration of polymer in solution depends on the thickness of film desired which in turn is limited by the viscosity of the solution. With a plastic polymer having a 300 to 350 N. S. T. the preferred composition of the solution is between about 1 and about 3 weight percent polymer. With 200 to 300 N. S. T. plastic polymers the preferred weight percent of polymer in the solution is between about 3 and about 5 percent. In general, with the lower N. S. T. polymers higher concentrations are desirable.

In applying the solution to metal surfaces, particular attention must be given to the viscosity of the solution in order to obtain a homogeneous uniform film of polymer upon the surface. It is preferred to maintain the viscosity of the solution in centripoise below about 100.

This viscosity is a function of both the temperature of solution and the concentration of polymer in the solution. The drawing accompanying this application is a graph drawn on semi-log paper showing the relationship between temperature and viscosity for various composition of solutions. The abscissa of the graph is the reciprocal of temperature and the ordinate is the viscosity in centipoise. The compositions of the solutions are labeled for each graph. It is preferred to use as high a no strength temperature polymer as possible with the solution in order to obtain a hard uniform surface which is not easily scratched or broken.

The film thickness of the polymer on the solid surface is a direct function of the concentration of solution. Viscosity depends on concentration and N. S. T. value of the plastic. Table III below shows the relationship between the film thickness and the concentration of solution for coated wires:

TABLE III

*Effect of plastic concentration on film thickness at 150° C.*

| Plastic | | Film Thickness, Mils |
|---|---|---|
| Percent | NST ° C. | |
| 5.0 | 314 | 1.45–1.65 |
| 4.0 | 314 | 1.45–1.7 |
| 3.0 | 314 | 0.35–0.45 |
| 2.5 | 314 | 0.35–0.45 |
| 2.0 | 314 | 0.2–0.35 |
| 1.5 | 314 | 0.2–0.25 |

The technique of application of the film to the surface determines the condition of surface on the object coated. If the proper technique is not followed the polymer film, particularly the film of plastic, upon the surface will contain blisters or bubbles and may often be brittle and susceptible to cracking. The solution is applied to the metal surface while the solution is at a temperature of about 130 to about 200° C. It is preferred to preheat the surface to be coated prior to application of the solution and to maintain contact between the surface and the solution for less than one hour. For the best results, the metal surface and solution are maintained at the above temperatures in contact with each other for one to ten minutes. The film thickness can be controlled by the concentration of polymer in the solution in accordance with the above table. Since the film thickness obtainable is limited for any given solution in order to get thicknesses greater than that shown by Table III, successive applications of the solution to the surface must be employed with drying of the surface between applications. It has been found that for best results not more than three applications of the solution to the surface should be employed. Preferably, two applications are employed. As an example, a solution is prepared containing the desired amount of polymer to give about half the desired film thickness. The surface to be coated is heated to a temperature between about 130 and 150° C. and the solution is heated within the same range prior to contact with the surface. In applying the polymer to copper, higher temperatures than the above tend to cause decomposition and corroding of the copper. The metal surface is then immersed in the solution at the predetermined temperature between about 130 and 150° C. for about five minutes. The metal surface is then withdrawn from the solution and dried at a temperature between about 140 and about 160° C. for a period of time less than about 30 minutes, preferably for a period of time between about 5 and about 15 minutes. The metal surface after drying and preheating is again immersed in the solution where it remains for about 5 minutes at the aforesaid temperature. The metal surface is then withdrawn from the second immersion and dried at a temperature between about 140 and about 160° C. for a period of time between about 5 and 15 minutes. The application of the polymer to the metal surface is complete at this point. However, for best results and to assure a uniform and smooth surface, the coated surface is preferably subjected to a last drying or sintering step at a temperature of about 390 to about 400° C. for 30 to 60 seconds. The working ranges of viscosities and film thicknesses per application can readily be obtained by those skilled in the art from the coordination of the viscosity chart of the drawing and Table III above referred to.

Some improvement has been obtained in coating copper wire by oxidizing or chloriding the surface of the copper wire prior to immersion in the solution of the polymer. In this manner the polymer is more firmly attached to the wire and, also, the tendency for the solvent to corrode the copper wire is minimized. Surfaces of 0.1 to 5 mils in thickness without blemishes can be obtained on fine copper wire by following the above technique. After evaporation of the solvent from the metal surface the solvent vapors are collected and condensed for reuse. In some instances it may be necessary to redistill the solvent to purify same prior to reuse of the solvent.

With copper and iron the application of the polymer must be carried out within the lower limits of the above temperature ranges, whereas with aluminum the temperature employed may be somewhat higher, but not above about 200° C. Plasticizers may be incorporated with the plastic polymer and solvent. Such plasticizers comprise polytrifluorochloroethylene oils and waxes prepared in a similar manner as described with respect to the solid polymer. Oils and waxes are obtained at somewhat higher temperatures and with increased amounts of peroxide promoter. Accordingly, a small amount of plasticizer is dissolved in the solvent together with the plastic polymer, the amount of plasticizer being less than about 5 percent by weight of the resulting solution. The use of a plasticizer increases the toughness and residence of the surface coating and makes the polymer film less susceptible to scratching or tearing.

The no strength temperature, or N. S. T. value, is obtained in the following manner: A normally solid polymer of trifluorochloroethylene is hot pressed into a $\frac{1}{8}''$ thick sheet and cut into a strip $\frac{1}{8}'' \times \frac{1}{16}'' \times 2''$ and grooved in the upper portion thereof to a thickness of $\frac{3}{64} \times \frac{1}{16}$ of an inch. A fine wire and a weight are attached to one end of the strip so that the total weight below the groove is ½ gram. The test strip is hung in a vertical position by the other end in an electrical furnace. The temperature of the sample is increased at the rate of 1½° C. per minute. When the sample breaks the temperature is recorded and this temperature is the no strength temperature of the solid polymer. A difference of 5° C. in the no strength temperature is considered significant. The no strength temperature of the polymer has been found to be independent of the heat treatment of the sample and is an indication of the resilience, brittleness, plasticity and, in general, the physical quality of the polymer.

The following examples illustrate solutions of solid polytrifluorochloroethylene and the method of applying films of the solid polymer to metal surfaces and wires. These examples are offered as a means for better understanding of the present invention and are not to be construed as unnecessarily limiting thereto.

EXAMPLES

Solubility tests were carried out with commercially available materials such as hydrocarbons, ethers, alcohols, etc. Since commercially available chlorofluorocarbons of the type suitable for solubility tests were limited to the Freons, it was necessary to prepare higher boiling compounds of this type in the laboratory. Therefore, the compound trifluoropentachloropropane and the product mixture from chlorine trifluoride treated hexachlorobutadiene were prepared as follows:

Trifluorotrichloropropene ($CF_3CCl=CCl_2$) was chlorinated in the liquid phase using ultra-violet light from a mercury arc and heat supplied by an infra-red lamp. Chlorine was introduced into the reaction mixture through a pyrex inlet tube and stirring was continuous throughout the chlorination. The chlorine was added intermittently over a period of 6½ hours, at which time the temperature was 113° C. and the chlorination had apparently ceased. The weight of the product indicated that the reaction was approximately quantitative. After distillation, the product was clear and colorless, and solidified at about room temperature as a white tough cake with a melting point of 105 to 108° C.

Several runs were made on the chlorofluorination of hexachlorobutadiene. The example given below is representative of the experimental procedure.

Hexachlorobutadiene, 2258 grams, was treated with 917 grams of chlorinetrifluoride, while the reaction temperature was maintained at 80° C. for 3¾ hours, at 90° C. for 1 hour, at 100° C. for 2¼ hours, and at 105° C. for 3½ hours. The unreacted and dissolved chlorinetrifluoride was removed from the product by bubbling nitrogen through the system while the temperature was held at 100° C. for 4 hours. The product weighed 2945 grams, which represents a yield of 94 percent based on the reaction of one mol of chlorinetrifluoride per mol of perchlorobutadiene. The filtered product was clear and colorless, and no unsaturation was detected with an acetone permanganate solution.

The chlorofluorobutane solvent prepared above showed some reactivity with copper wire, as discussed subsequently, and, therefore, this material was stabilized by fluorination with cobaltic fluoride. Cobaltic fluoride, 50 grams, and 455 grams of reaction product obtained from the treatment of hexachlorobutadiene with chlorine trifluoride were heated slowly in a copper vessel with stirring to 60° C. without apparent reaction. The temperature of the reaction mixture was increased slowly to 100° C. over a period of 1½ hours and then held at 110° C. for ½ hour and at 100° C. for 2 hours, at which time the $CoF_3$ appeared to be completely consumed. An additional 50 grams of $CoF_3$ were added at 100° C. and the temperature increased to 145° C. for 1 hour. After 1 hour at 145° C., the $CoF_3$ again appeared to be completely reacted. The completeness of reaction of the $CoF_3$ was judged by a change in color from a light grey to red characteristic of $CoF_2$. The reaction mixture was filtered through a sintered glass filter and 270 grams of a clear, colorless liquid obtained. The cobalt fluoride oil cake weighed 187 grams, which indicated a hold-up of 105 grams of product, providing all the $CoF_3$ had completely reacted.

Table IV below shows distillation of the stabilized and unstabilized $C_4F_xCl_y$ and indicates the recovery of two main fractions. The fraction boiling at 95° C. is the preferred solvent and analyzed 60.7% chlorine and a molecular weight of 341, indicating that this fraction is predominantly composed of $C_4Cl_6F_4$.

TABLE IV

[$C_4F_xCl_y$ reacted with 20% of its weight of $CoF_3$]

| Pressure, mm. | B. P., ° C. | Percent of Total Distillate |
|---|---|---|
| 20 | 95 | 57.0 |
| 20 | 122 | 30.5 |

[$C_4F_xCl_y$ reacted with 50% of its weight of $CoF_3$]

| Pressure, mm. | B. P., ° C. | Percent of Total Distillate |
|---|---|---|
| 20 | 65 | 13 |
| 20 | 95 | 74 |

[Unstabilized $C_4F_xCl_y$]

| Pressure, mm. | B. P., ° C. | Percent of Total Distillate |
|---|---|---|
| 20 | 95 | 26 |
| 20 | 122 | 50 |

(Decomposition after 66% distillation of charge.)

Solubility tests of finely powdered normally solid polytrifluorochloroethylene of 314 N. S. T. were made using compounds with various molecular structures. The results of this work are condensed in Table V below.

The polymer was insoluble in all the hydrocarbons, ethers, alcohols, nitrochloro compounds, chloro compounds tested. Solubility, however, was observed in tetrachlorodifluoroethane, trifluoropentachloropropane, and the reaction product of hexachlorobutadiene and chlorine trifluoride.

TABLE V
*Results of solubility tests*

| Fluorochloro Compounds | Polymer, percent | Temp., ° C. | Solubility | Viscosity |
|---|---|---|---|---|
| Methyl Trifluorochloroethyl ether | 5 | 140 | Insol | |
| | 1 | 120 | Soluble | Fluid; same as solvent. |
| Tetrachlorodifluoroethane | 5 | 130 | ---do--- | Fairly viscous. |
| | 1 | 120 | ---do--- | Fluid; same as solvent. |
| Trifluoropentachloropropane | 2.9 | 135 | ---do--- | Fluid. |
| | 4.8 | 140 | ---do--- | Fairly viscous. |
| | 1 | 120 | ---do--- | Fluid; same as solvent. |
| | 3 | 130 | ---do--- | Fairly viscous. |
| Perfluorochlorobutane ($C_4Cl_6+ClF_3$) | 4.8 | 130 | ---do--- | Very viscous. |
| | 10 | 130 | ---do--- | Clear gel found at 130° C. with each of 4 cuts which would not flow when heated to 175° C. |
| Hydrocarbons: | | | | |
| Decalin | 1 | 180 | Insol | |
| Kerosene | 3 | 165 | ---do--- | |
| Kerosene—15% toluene | 3 | 130 | ---do--- | |
| Ethers: | | | | |
| B,B'-dichloroethyl ether | 1 | 175 | ---do--- | |
| Diethylene glycol | 1 | 220 | ---do--- | |
| Alcohols: | | | | |
| Octanol-1 | 1 | 190 | ---do--- | |
| Etuylene glycol | 1 | 190 | ---do--- | |
| Nitro (Chloro) Compounds: | | | | |
| 1,1-dichloro-1-nitropropane | 1 | 140 | ---do--- | |
| Chloro Compounds: | | | | |
| Pentachloroethane | 1 | 160 | ---do--- | |
| Tetrachloroethylene | 1 | 120 | ---do--- | |
| Hexachlorobutadiene | 1 | 200 | ---do--- | |

The viscosity of the solution appeared to vary with the individual solvent employed. The N. S. T. of the polymer also affected the viscosity of the solution.

Solutions of solid polytrifluorochloroethylene and the above chlorofluorocarbon solvents were obtained at temperatures above about 120° C. With the tetrachlorodifluoroethane solvent it was necessary to maintain the system under pressure, which would present a serious problem if this solvent were employed for application work. In all instances, cooling of the solutions to a temperature below about 120° C. resulted in a separation of the polymer from the solvent.

In addition to the results presented in Table V, a comparison is given below of the solubility characteristics of the cobalt fluoride treated and untreated per chlorofluorobutane solvent.

TABLE VI

*Comparative solvent properties*

[5% plastic.]

| Temp., ° C. | CoF$_3$ Stabilized Chlorofluorobutane | Unstabilized Chlorofluorobutane |
|---|---|---|
| 80 | Mix. transparent,a no viscosity change. | Mixture cloudy, no viscosity change. |
| 105 | Clear, polymer in lumps (dissolving). | Do. |
| 120 | Clear, very viscous solution. | Clear, polymer in lumps (dissolving). |
| 130 | ----do---- | Clear, very viscous solution. | a Particles and solvent have similar refractive indices at indicated temperature.

It was indicated by the above and other tests that the treated solvent was a superior solvent than the untreated material.

The method employed in the various tests used for determining solubility is as follows: A large test tube containing the liquid and a definite percentage of polymer, based on the liquid, was heated in an oil bath. A thermometer immersed in the mixture was used as a stirring rod to indicate apparent viscosity changes and temperature of the system. The visual disappearance of polymer in the liquid was not used as a criterion of solubility.

An apparent change in viscosity of the polymer solvent mixture proved to be the most reliable indication of solubility. Occasionally, the polymer appeared to go into solution by visual observation without a viscosity change which is probably due to the index of refraction being the same for both the polymer and solvent at a certain temperature. Usually when this occurred, the polymer powder would be again visible as the temperature was increased.

Compounds that boiled below the temperatures used for the test were mixed with the polymer in glass ampoules and sealed. The highest temperature attained during an experiment depended on boiling point of the compound being tested or the temperature at which a polymer solution was obtained. The solubility temperatures are those at which the solvent dissolved powdered polymer at a reasonably rapid rate.

In the application of the polymer solutions to surface coating, reactivity with copper was observed in some instances. Tests indicated that the solvents employed were not stable to copper at elevated temperatures. The tendency for reactivity of the solvent with metals, such as copper, led to the stabilization of the chlorofluorobutanes with CoF$_3$. A comparison was made with stabilized and unstabilized chlorofluorobutane for reactivity with copper wire with the following results shown in Table VII below:

TABLE VII

*Stability towards copper wire*

| Temp., ° C. | Time, Hr. | CoF$_3$ Stabilized Perchlorofluorobutane | Unstabilized Perchlorofluorobutane |
|---|---|---|---|
| 145 | 0.5 | Wire unchanged | Wire tarnished. |
| 145 | 2.5 | Wire slightly tarnished | Wire very dark. |
| 140 | 20.5 | Wire tarnished, liquid clear | Wire black, liquid cloudy. |

The results showed the cobalt fluoride stabilized chlorofluorobutane to be superior to the unstabilized material.

Strong films of trifluorochloroethylene plastic polymer 2.5 to 3.5 mils thick were prepared from solutions of the plastic in the CoF$_3$ treated and untreated chlorofluorobutane (C$_4$Cl$_6$+ClF$_3$) solvent and trifluoropentachloropropane by evaporating the solvents from thin layers of solutions in pyrex dishes at 155° C. The untreated chlorofluorobutane solvent decomposed considerably, as evidenced by the colored film, while a clear transparent film was obtained after evaporation of the CoF$_3$ treated solvent. The trifluoropentachloropropane also decomposed slightly since the film was slightly colored.

Due to the extreme viscosity of the solutions prepared with the chlorofluorobutane solvent, numerous bubbles were found in the film cast from a 4% solution. However, by using a 3% solution the bubbles were essentially eliminated. A 5% solution of the polymer in trifluoropentachloropropane is approximately as fluid as a 3% solution of chlorofluorobutane solvent and no bubbles were found in the film prepared from this solution. The preferred concentration of plastic in solvent will also depend on the N. S. T. values of the plastic.

Aluminum foil was coated with thin films of polymer approximately 0.4 mil thick by dipping the foil into 3% solutions of polymer in perfluorochlorobutane solvent and drying in an oven at 155° C. The solvent appeared to be completely evaporated at this temperature within an hour and the foil did not appear to be tarnished. The thin film did not tear when the foil was bent sharply. However, once the film is torn it is easily removed from the foil.

Copper wire was coated with thin films (0.5 mil) using 4% solution of polymer in CoF$_3$ treated and untreated perchlorofluorobutane. The film became colored and brittle upon evaporation of the untreated solvent and continued heating at 155° C. for several hours. The wire was also badly tarnished. The film was found to be stable when the CoF$_3$ treated solvent was used. The film did not appear to be brittle after drying several hours at 145° C. However, after heating in the oven at 145° C. over a period of two days, the film was found to be brittle, colored, and the wire tarnished.

Solutions containing 1.0–2% plastic are quite fluid at 150° C. and can be stirred gently with a glass rod without trapping air bubbles in the solutions. However, in order to prepare films 1.2–1.5 mils in thickness, 2 to 3 successive dips are required for a 2% solution and 4 to 5 dips are required for a 1.5% solution. Although the film (approximately 0.25 mil) resulting from the first dip into a 1.5% solution is prepared blister-free, imperfections occur with successive dips.

The following examples illustrate the effect of the bake temperature. A carbon steel plate dipped into a 2% plastic solution at 170° C. and dried 1 hour at 170° C. was almost completely blistered. A similar plate was immersed in a 1.5% solution at 135° C. for 2 minutes, withdrawn, and dried 1½ hours at 135° C. The plate was dipped rapidly the second time and dried 15 minutes at 135° C. without any imperfections occurring. The plate was again immersed and withdrawn rapidly and baked 15 minutes at 135° C. No imperfections were observed on the side of the plate, while only four small imperfections were observed on the opposite side. The film thickness after three successive dips was approximately 0.6 mil.

The thin films of plastic, 0.5 mil, do not dissolve rapidly in the 1.5% solutions at 150° C., and coated samples have been immersed in the solution for one to twenty minutes with an increase of approximately 0.25 mil resulting after withdrawing from the solution and baking. Fewer imperfections occur with shorter periods of immersion.

The effect of the time of baking between successive dips is shown from the following tests. Carbon steel plates dipped into 1.5% solutions were dried from 15 minutes to 72 hours at 150° C., from 15 minutes to 1½ hours at 135° C., and heated at 390–400° C. for 0.5 to 1 minute after drying 25 minutes at 150° C. before dipping a second time. Imperfections usually occurred in most of the cases. The carbon steel plate dried 1½ hours at 135° C. after the first dip was dipped a second time at 135° C. and dried 15 minutes without the detection of imperfections. Another plate dipped into the 1.5% solution was dried 25 minutes at 150° and then heated at 390 to 400° C. for 30 seconds. No imperfections were found after the plate was dipped a second time and dried 20 minutes at 150° C.

Clean copper wire, oxide coated copper wire, and chloride coated copper wire were coated with thin films of polymer. The oxide coated wire was prepared by drawing the wire through a flame until coated with the black oxide, while the chloride coated wire was prepared by immersing clear copper wire in a dilute hydrochloric acid solution for 2 to 3 days and then air drying for about 24 hours. The wires were coated with thin films, approximately 0.5 to 1 mil, by dipping into a 3% solution of plastic at 150° C. and drying at 150° C. for 1 hour. The 3% solution was prepared from powdered plastic, N. S. T. 314° C., and the $CoF_3$ treated chlorofluorobutane solvent. One clean copper wire, one oxide coated copper wire, and one chloride coated copper wire coated with polymer and dried 1 hour at 150° C. were held for analysis. A second set of the three wires coated as described above was heated at 150° C. for 24 hours and a third set at 200° C. for 24 hours. The oxide coated wire appeared most resistant to corrosion and discolorization. The chloride coated wire was next best, and the clean wire appeared to be corroded most.

The present invention includes within its scope polymers of trifluorochloroethylene which include a minor amount of other monomers, such as vinyl chloride, tetrafluoroethylene, perfluoropropene and acrylonitrils. The use of these other monomers is limited to less than about 15 percent of the polymer. In some instances it is desirable to use small quantities of other monomers in combination with the principal monomer trifluorochloroethylene in order to impart modified characteristics to the resulting polymer.

We claim:

1. A solution comprising a plastic polymer of trifluorochloroethylene dissolved in a saturated perfluorochlorocarbon having at least two carbon atoms per molecule at a temperature of at least about 110° C., the concentration of plastic polymer in said solution being between about 1 and about 10 weight percent, said solution containing in addition, as plasticizer, a polymer of trifluorochloroethylene having a molecular weight not higher than that of the waxy polymer.

2. A solution of a normally solid polymer of trifluorochloroethylene dissolved in hexachlorotetrafluorobutane, said solution containing in addition, as plasticizer, a polymer of trifluorochloroethylene having a molecular weight not higher than that of the waxy polymer.

3. A solution comprising a normally solid polymer of trifluorochloroethylene dissolved in trifluoropentachloropropane, said solution containing in addition, as plasticizer, a polymer of trifluorochloroethylene having a molecular weight not higher than that of the waxy polymer.

4. A solution comprising a normally solid polymer of trifluorochloroethylene dissolved in octafluorooctachloroheptane, said solution containing in addition, as plasticizer, a polymer of trifluorochloroethylene having a molecular weight not higher than that of the waxy polymer.

5. A solution comprising a normally solid polymer of trifluorochloroethylene dissolved in tetrachlorodifluoroethane, said solution containing in addition, as plasticizer, a polymer of trifluorochloroethylene having a molecular weight not higher than that of the waxy polymer.

6. A solution comprising plastic polymer of trifluorochloroethylene dissolved in a perfluorochlorobutane at a temperature above about 120° C., the concentration of plastic in said solution being between about 1 and about 10 weight percent, said solution containing in addition, as a plasticizer, a polymer of trifluorochloroethylene having a molecular weight not higher than that of the waxy polymer.

7. A solution comprising plastic polymer of trifluorochloroethylene and a waxy polymer of trifluorochloroethylene as a plasticizer dissolved in a perfluorochlorobutane at a temperature above about 120° C., said solution having a viscosity below about 100 centipoise.

8. A solution comprising plastic polymer of trifluorochloroethylene having an N. S. T. between about 200 and about 350° C. and a waxy polymer of trifluorochloroethylene as a plasticizer dissolved in a solvent prepared by chlorofluorinating hexachlorobutadiene and subsequently fluorinating the product of the chlorofluorination of the hexachlorobutadiene.

9. A solution comprising a plastic polymer of trifluorochloroethylene dissolved in a perfluorochlorobutane as a solvent at a temperature of at least 110° C., said solution containing in addition, as plasticizer, a polymer of trifluorochloroethylene having a molecular weight not higher than that of the waxy polymer.

10. A solution comprising a plastic polymer of trifluorochloroethylene having an N. S. T. between about 200 and about 300° C. and a waxy polymer of trifluorochloroethylene as a plasticizer dissolved in an amount of about 3 to about 5 weight percent in an acyclic perfluorochlorobutane.

11. A solution comprising a plastic polymer of trifluorochloroethylene having an N. S. T. between about 300 and about 350° C. and a waxy polymer of trifluorochloroethylene as a plasticizer dissolved in an amount of about 1 to 3 weight percent in an acyclic perfluorochlorobutane.

12. The method for preparing a solution of the plastic polymer of trifluorochloroethylene which comprises admixing an amount of finely-divided plastic polymer of trifluorochloroethylene and an amount of waxy polymer of trifluorochloroethylene with a perfluorochlorobutane sufficient to maintain the concentration of the plastic less than about 10 weight percent and to maintain the concentration of wax less than about 5 percent and maintaining the mixture of solvent, plastic and wax at a temperature of at least 120° C.

13. The method for applying a thin uniform film of the plastic polymer of trifluorochloroethylene to copper wire which comprises oxidizing the surface of the copper wire, contacting the copper wire with a solution comprising the plastic polymer of trifluorochloroethylene in a perfluorochlorobutane as the solvent at a temperature of at least 110° C. and below 200° C. a plurality of times, drying the wire between contacts, and sintering the plastic film on the wire at an elevated temperature after the last contact.

14. A solution comprising a normally plastic polymer and a normally waxy polymer of trifluorochloroethylene dissolved in a liquid selected from the group consisting of an acyclic perfluorochlorobutane, trifluoropentachloropropane, octafluorooctachloroheptane and tetrachlorodifluoroethane.

15. The method for preparing the solution of a plastic polymer of trifluorochloroethylene which comprises admixing an amount of finely divided plastic polymer of trifluorochloroethylene and an amount of a lower molecular weight polymer of trifluorochloroethylene having a molecular weight not higher than that of the waxy polymer with a saturated perfluorochlorocarbon having at least two carbon atoms per molecule and maintaining the mixture of perfluorochlorocarbon, plastic polymer and lower molecular weight polymer at a temperature of at least 110° C. such that the solid polymer and lower molecular weight polymer become dissolved in the perfluorochlorocarbon solvent at a temperature not lower than 110° C.

16. A solution comprising a plastic polymer of trifluorochloroethylene and a polymer of trifluorochloroethylene having a molecular weight not higher than that of the waxy polymer dissolved in a saturated perfluorochlorocarbon having at least two carbon atoms per molecule.

17. The method of applying a uniform film of a plastic polymer of trifluorochloroethylene to copper wire which comprises oxidizing the surface of the copper wire, contacting the copper wire with a solution comprising the plastic polymer of trifluorochloroethylene in a saturated perfluorochlorocarbon having at least two carbon atoms per molecule as the solvent, at a temperature of at least 110° C. and below 200° C. a plurality of times, drying the wire between contacts, and sintering the plastic film on the wire at an elevated temperature after the last contact.

References Cited in the file of this patent

UNITED STATES PATENTS

| | | |
|---|---|---|
| 2,174,912 | Thielking | Oct. 3, 1939 |
| 2,362,397 | Pearce | Nov. 7, 1944 |
| 2,420,222 | Benning | May 6, 1947 |
| 2,456,255 | Coffman | Dec. 14, 1948 |
| 2,484,484 | Berry | Oct. 11, 1949 |
| 2,718,511 | Sprung et al. | Sept. 20, 1955 |

OTHER REFERENCES

Industrial and Eng. Chem., article by Miller et al., March 1947, volume 39, No. 3, pages 333–337.